United States Patent [19]
Calvert

[11] Patent Number: 5,606,868
[45] Date of Patent: Mar. 4, 1997

[54] RETICULATED FOAM SLEEVE FOR EVAPORATIVE COOLING UNIT SPRAY CONDUIT

[75] Inventor: Philip D. Calvert, Center, Tex.

[73] Assignee: General Shelters of Texas S.B., Inc., Center, Tex.

[21] Appl. No.: 399,945

[22] Filed: Mar. 6, 1995

[51] Int. Cl.⁶ .................................................. F28C 1/00
[52] U.S. Cl. .................. 62/315; 62/304; 62/310; 261/103; 261/106; 239/145; 239/562; 239/567
[58] Field of Search .............................. 62/304, 310, 314, 62/316, 315; 261/103, 106, 97; 239/562, 566, 567, 145

[56] References Cited

U.S. PATENT DOCUMENTS

| | | | |
|---|---|---|---|
| D. 211,086 | 5/1960 | Christopher . | |
| D. 284,505 | 7/1986 | Bowman et al. . | |
| D. 327,737 | 7/1992 | Sanchez . | |
| 2,094,870 | 10/1937 | Brown | 62/316 |
| 2,497,947 | 2/1950 | Lewis | 261/106 |
| 2,606,009 | 8/1952 | Long . | |
| 2,807,505 | 9/1957 | Weitzel | 239/145 |
| 3,322,405 | 5/1967 | Knudson et al. . | |
| 3,977,606 | 8/1976 | Wyss | 239/145 |
| 4,031,180 | 6/1977 | Bohanon . | |
| 4,389,352 | 6/1983 | Bohanon, Sr. . | |
| 4,443,386 | 4/1984 | Wrightson . | |
| 4,468,357 | 8/1984 | Miller et al. . | |
| 4,615,182 | 10/1986 | Worthington . | |
| 4,701,286 | 10/1987 | Stillman et al. . | |
| 4,933,117 | 6/1990 | Wilson . | |
| 5,130,063 | 7/1992 | Collins et al. . | |
| 5,168,832 | 12/1992 | Price . | |

OTHER PUBLICATIONS

General Shelters of Texas S. B., Inc. Cooling Division, "Port–A–Cool Owners Manual", Sep. 1994, Version 1.0, pp. 1–9.
General Shelters of Texas S. B., Inc. Cooling Division, "Port–A–Cool Distributors Manual", Sep. 1994, Version 1.0, pp. 1–21.

Primary Examiner—John M. Sollecito
Attorney, Agent, or Firm—Gregory M. Howison, Esq.

[57] ABSTRACT

A portable evaporative cooling unit (10) is disclosed. A housing (12) has a front opening (46) and a rear opening (20). Air-permeable water absorption media (22) are disposed across the rear opening (20) of the housing (12). An electric motor driven fan (42) having fan blades (44) is disposed in the front opening (46) of the housing (12) for drawing air through the water absorption media (22). A supply conduit (94) connects a water pump (52) to an elongated horizontal spray bar (64) disposed above the water absorption media (22). The spray bar (64) extends substantially the width of the water absorption media (22) and has a plurality of spaced holes (72) in its upper surface for distributing water. A foam sleeve (68) is disposed around the entire length of the spray bar (64). The foam sleeve (68) absorbs water expelled from the plurality of holes (72) and distributes the water onto the water absorption media (22). A water tank (50) in the bottom of the housing (12) contains a submersible, self-priming pump (52). A water inlet (36) is connectable to an external water source for supplying makeup water to the water tank (50). A float valve (96) maintains a predetermined level of water in the tank (50) as water is consumed during the operation of the unit (10). The housing is mounted on a frame (14) and casters (16) are attached to the bottom of the frame (14) for providing portability to the unit (10).

28 Claims, 4 Drawing Sheets

RETICULATED FOAM SLEEVE FOR EVAPORATIVE COOLING UNIT SPRAY CONDUIT

TECHNICAL FIELD OF THE INVENTION

The present invention relates to an evaporative cooling unit and, more particularly, to a water delivery device for the evaporative cooling unit.

BACKGROUND OF THE INVENTION

In many geographical areas, daytime temperatures during summer periods rise to levels which are uncomfortable for many outdoor work or recreational activities, such as construction work, oil and gas well operation, lawn and garden care, and outdoor sports activities. People who engage in outdoor work or recreational activities on hot sunny days usually have little relief from the heat, other than an occasional breeze or cloud cover.

Although refrigerated air conditioning has found widespread usage in many parts of the world, it is, of course, completely impractical for cooling outdoor areas. In addition, there remain many types and uses of buildings for which refrigerated air conditioning is unavailable, impractical or cost prohibitive. Examples of buildings and uses in which air conditioning is normally not provided include vehicle repair garages, gymnasiums, warehouses, welding shops, sheet metal fabrication shops and aircraft hangars. During hot summer periods, these non-air conditioned buildings can become very warm and uncomfortable for their occupants. Although electric fans are frequently used in an attempt to make non-air conditioned spaces more comfortable, fans only circulate the warm air without reducing the temperatures and, therefore, have limited success in improving comfort.

Some non-air conditioned buildings are equipped with an evaporative cooling system which moves warm air through air-permeable, water saturated pads to lower the air temperature by moisture evaporation. This system utilizes an evaporative cooling unit which is usually roof-mounted and contains an electric motor-driven blower, a water pump and the air-permeable pads. Water is provided to the evaporative cooling unit through piping connected to the building plumbing system.

The primary advantage of evaporative cooling over refrigerated air conditioning is its much lower operating cost. However, permanent positive pressure evaporative cooling systems are best suited for building spaces having low ceilings for providing air distribution outlets. Evaporative cooling systems are usually not feasible for large building spaces having high ceilings, such as gymnasiums, aircraft hangars and many warehouses. In buildings for which it is feasible, a permanent positive pressure evaporative cooling system usually requires, in addition to the evaporative cooling unit themselves, custom fabrication and installation of a ducted air distribution system similar to that required for a refrigerated air conditioning system. In fact, a positive pressure evaporative cooling system usually requires larger air supply ducts than a refrigerated air conditioning system because of the high air flow rates required. Therefore, a permanent positive pressure evaporative cooling system can be nearly as expensive to install as refrigerated air conditioning, and its expense is frequently too high to be justified. This is particularly true for buildings which are infrequently occupied by people, such as warehouses, greenhouses and aircraft hangars.

Consequently, a need exists for an apparatus for providing air cooling in buildings for which refrigerated air conditioning and permanent evaporative cooling systems are unavailable, impractical or cost prohibitive. Preferably, such a cooling system will be self-contained, compact and easily portable, so that it can be moved about from place to place to provide cooling where temporarily needed. Such cooling apparatus will preferably also be inexpensive and simple to manufacture, have a low operating cost and be operable on standard 110 volt electric current. Ideally, such cooling apparatus will be usable either indoors or outdoors.

As part of these apparatus, a spray bar assembly is provided which sprays the water upwardly onto a bonnet, such that it may then fall down against the water absorption media. Even though jets of water are forced through the pipe and the jets of water impinge on the inner surface of the bonnet, the water is not fully dispersed and some dry spots are left. Impingement alone does not distribute the circulated water evenly to the evaporative medium. Evaporative cooler recirculation pumps do not produce high enough head pressure to allow impingement spreading alone to function well. Also, spraying the water up against the bonnet causes water to come into contact with the housing itself. The water does not drop away from the bonnet, but follows the bonnet to the outer sides of the water absorption media, thereby not fully saturating the water absorbing media. This can cause leaks, corrosion and other problems. Also, the water can be sprayed around the area as it deflects off of the bonnet.

SUMMARY OF THE INVENTION

The present invention disclosed and claimed herein comprises an evaporative cooling unit. A housing is provided having front and rear openings for passage of air therethrough. Air-permeable water absorption media are disposed across the rear opening of the housing. An electric motor-driven fan is disposed in the front opening of the housing for drawing air through the water absorption media and housing. A horizontal, elongated spray conduit is disposed below the housing above the water absorption unit. The spray conduit extends substantially the width of the water absorption media and has a plurality of spaced holes in its upper surface for distributing water from the spray conduit into the foam sleeve. The foam sleeve absorbs water from the spray conduit and distributes it onto the water absorption media. A water supply system is provided for supplying water to the spray conduit.

In another aspect of the present invention, the elongated spray conduit is disposed above the air-permeable water absorption media and parallel to the top of the air-permeable water absorption media, such that the water is then distributed onto the air-permeable water absorption media. In yet another aspect of the present invention, the inside diameter of the foam sleeve is exactly equal to the outside diameter of the elongated spray conduit. In yet another aspect of the present invention, the inside diameter of the foam sleeve is slightly larger than the outside diameter of the elongated spray conduits such that when the foam sleeve absorbs water, the foam sleeve sags downwardly from the elongated spray conduit, forming a gap between the foam sleeve and the elongated spray conduit. In yet another aspect of the present invention, the foam sleeve is comprised of fully reticulated ether foam which is heat sealed along a seam to form a cylinder. In yet another aspect of the present invention, the foam sleeve fully covers the entire length of the elongated spray conduit, including end caps. The spaced holes are disposed along the entire length of the elongated spray conduit, such that water may be distributed from the spray conduit onto the full width of the water absorption media.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
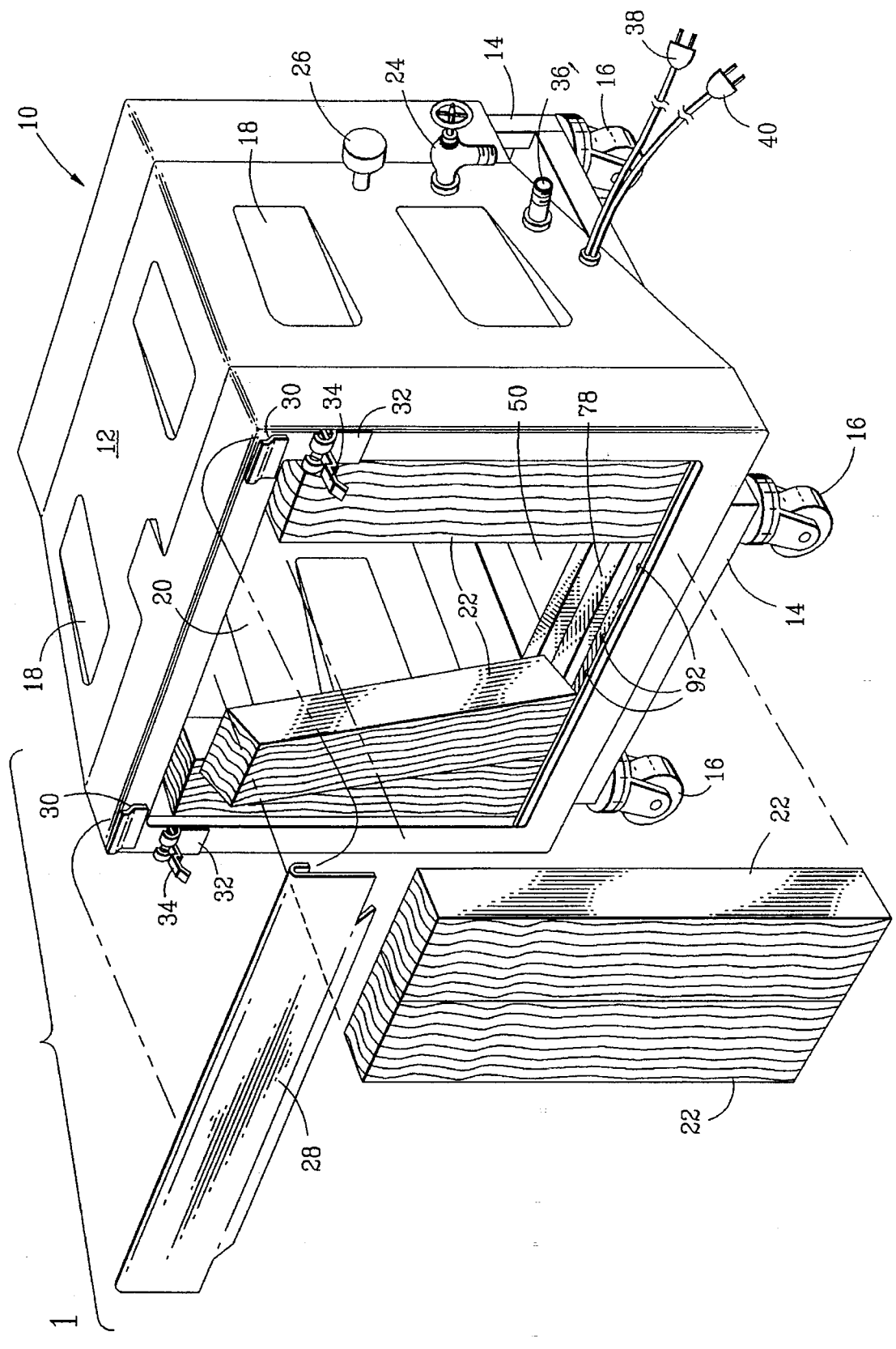
FIG. 1 illustrates an evaporative cooling unit.

Referring now to FIG. 1, there is illustrated an evaporative cooling unit, generally designated 10. The evaporative cooling unit 10 includes a housing 12 mounted on a frame 14. Wheels or casters 16 are attached to the bottom of frame 14 for providing portability to the evaporative cooling unit 10. The top and both sides of the housing 12 include recesses 18 for providing strength and structural stability to the housing 12. Housing 12 includes a large, generally rectangular-shaped rear opening 20. A plurality of air-permeable pad media sections 22 are disposed across rear opening 20 of housing 12. Some of the pad media sections 22 are shown partially or fully removed from housing 12 to illustrate how they are removed and replaced. A drain valve 24 and a flow control valve 26 are provided and attached to housing 12.

Mounting brackets 30 are provided and attached to the housing 12 in the upper corners of the rear opening 20. One mounting bracket 30 is attached near each upper corner and above rear opening 20 of the housing 12. The upper portions of brackets 30 are parallel to but spaced slightly away from housing 12. A removable pad retainer 28 is provided to hold pad media sections 22 in place. A J-hook formed in the removable pad retainer 28 hooks into the upper portion of the mounting brackets 30. Two hold-down clamps 32 are provided and attached to the housing 12 just below the mounting brackets 30. One hold-down clamp 32 is located below each mounting bracket 30. Each hold-down clamp 32 has a clamping lever 34 pivotally attached thereto.

To install the removable pad retainer 28 on housing 12, the J-hook of removable pad retainer 28 is first placed over the brackets 30. Notched corners of the removable pad retainer 28 are then clamped down against housing 12 by manually pivoting clamping levers 34 upward into engagement with the corners of the removable pad retainer 28. When retainer 56 is to be removed from housing 12 to permit removal of pad media sections 22, clamping levers 34 of hold-down clamps 32 are pivoted downward and retainer 28 is then lifted off of brackets 30. Retaining screws (not shown) may be used instead of the hold-down 32 clamps.

An inlet fitting 36 is provided which may be threaded onto a standard garden or utility hose. A pump power cord 38 and a fan power cord 40 are provided to provide power to the evaporative cooling unit 10.

Figure 2:
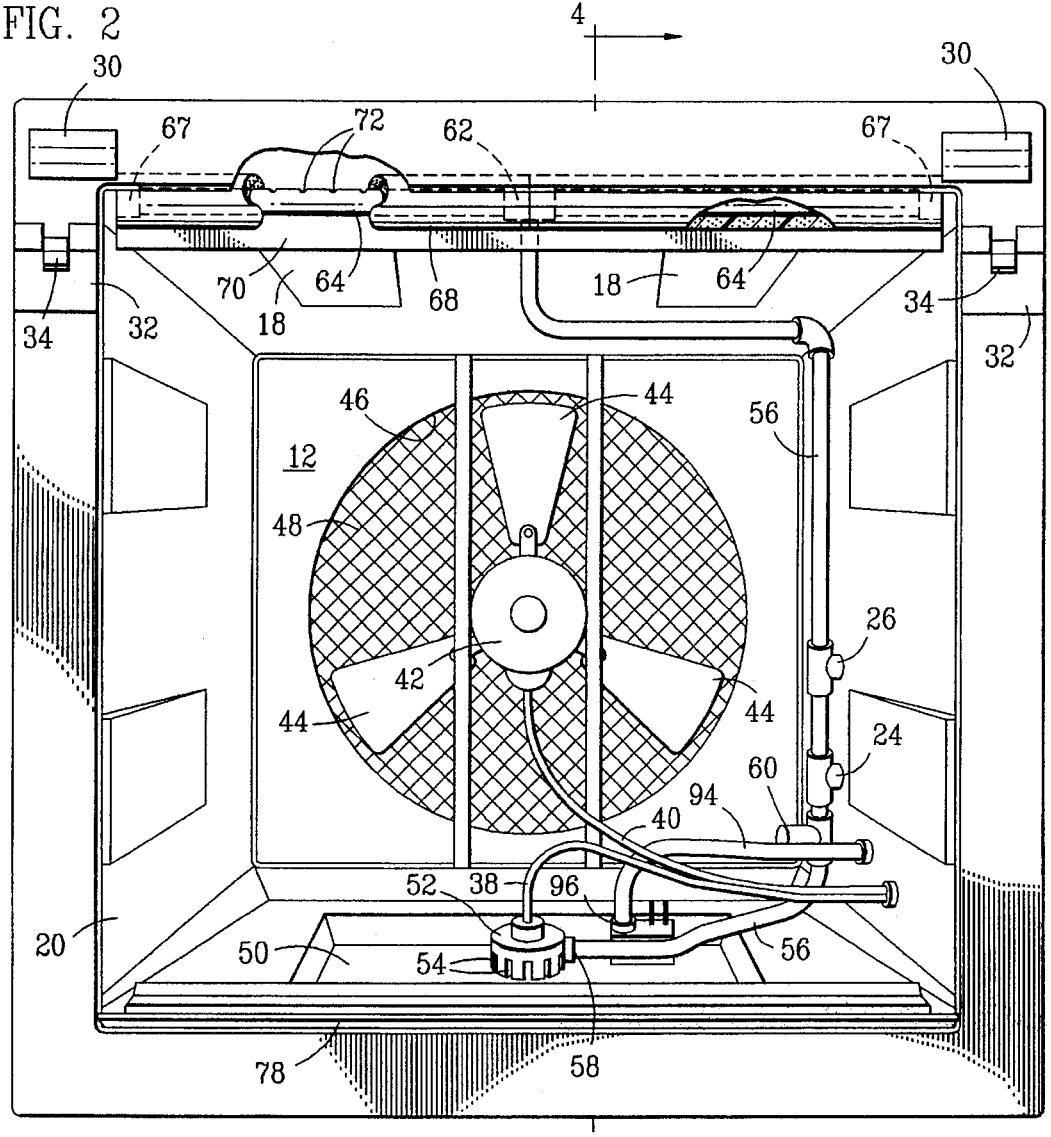
FIG. 2 illustrates a rear view of the evaporative cooling unit with the pad media sections fully removed.

Referring now to FIG. 2, there is illustrated a rear view of the evaporative cooling unit 10 with the pad media sections 22 fully removed. An electric motor-driven fan 42 is provided. The fan 42 has three or four blades 44. The fan 42 is mounted in a circular front opening 46 in housing 12. Covering the circular front opening 46 is a fan guard 48 installed on the front side of housing 12 so as to cover the fan blades 44. The fan guard 48 preferably comprises a wire grille or screen having openings approximately ½ inch by two inches to satisfy OSHA safety regulations.

A water tank 50 is formed in the bottom of housing 12. A submersible, self-priming pump 52 is located inside of water tank 50. Inlets 54 to pump 52 are located near the floor of water tank 50 and are in communication with the water tank 50. A supply conduit 56 is provided. One end of the supply conduit 56 is connected to pump outlet 58 of pump 52. A filter or strainer 60 may be installed in the supply conduit 56 for removing contaminants and debris from the water delivered to the pad sections 22. The drain valve 24 and the flow control valve 26 are also disposed along the supply conduit 56. At its upper end, supply conduit 56 is connected to spray bar 64 at "T" fitting 62. The "T" fitting 62 is located at the center of the spray bar 64 in order to equalize the pressure at each end of the spray bar 64. The ends of the spray bar 64 are closed by caps 67 or other suitable means. A foam sleeve 68 is provided consisting of fully reticulated 30 ppi ether foam and charcoal. The foam is ¼ inch thick and in the shape of a cylinder with a hollow area inside. The foam sleeve 68 is disposed over the spray bar 64. This will be described in more detail hereinbelow.

Water tank 50 is provided with a water inlet conduit 94 and a float valve 96. Water inlet conduit 94 passes through the side wall of the housing 12 and terminates in the inlet fitting 36. Fitting 36 is preferably a standard male garden hose fitting for receiving the female fitting on a garden or utility hose (not shown) for providing makeup water to water tank 50. The opposite end of the water inlet conduit 94 is connected to the water inlet on float valve 96. Float valve 96 is responsive to the water level in tank 50 and selectably opens and closes the water inlet so as to maintain a predetermined water level in tank 50 as water is consumed during operation of evaporative cooling unit 10. The pump power cord 38 and the fan power cord 40 are shown.

Figure 3:
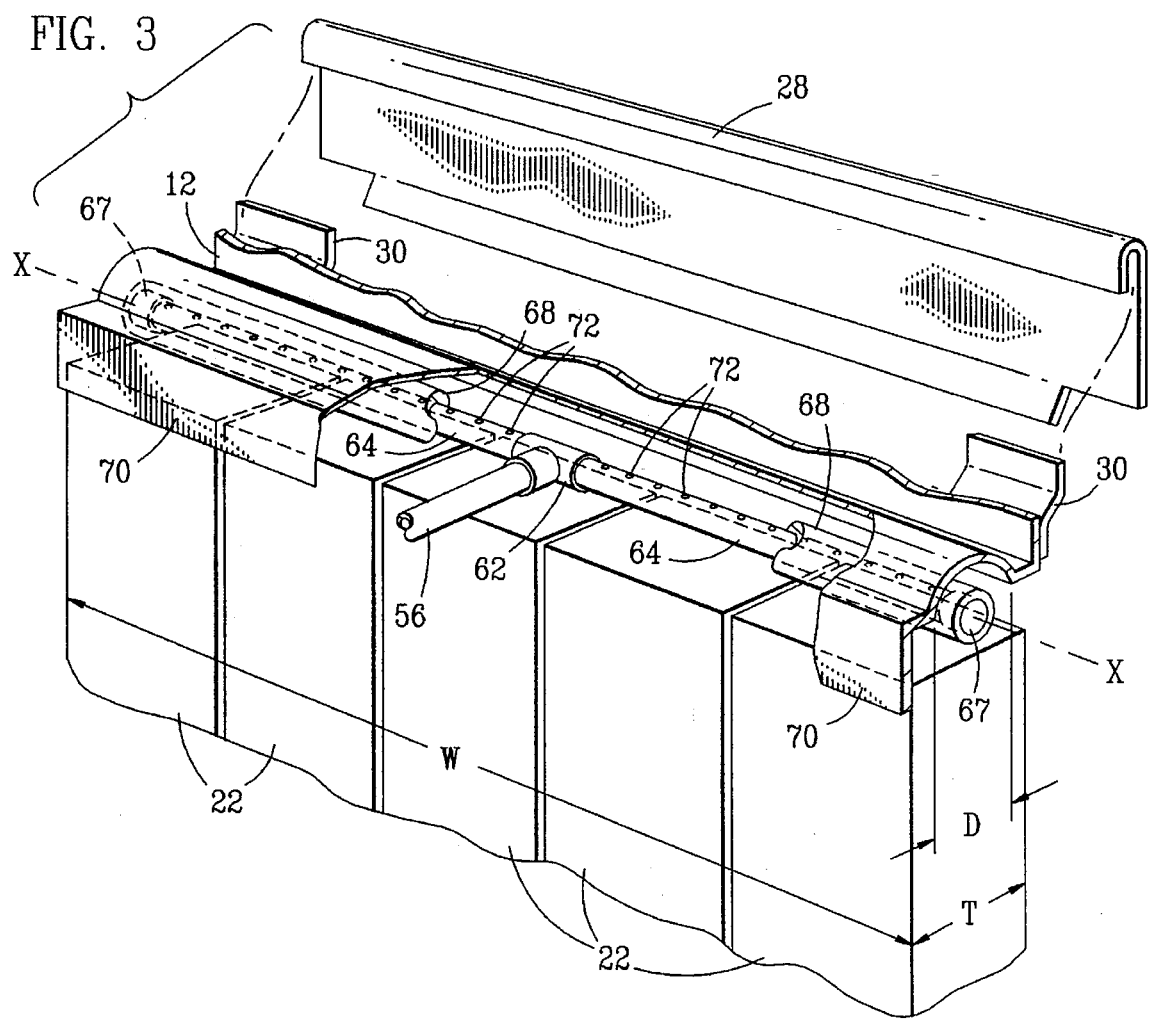
FIG. 3 illustrates a partially fragmented perspective view of the water distribution system of the evaporative cooling unit.

Referring now to FIG. 3, there is shown a partially fragmented perspective view of the water distribution system of evaporative cooling unit 10. The pad media sections 22 are shown and they are held in place by removable pad retainer 28 which connects to mounting brackets 30 disposed on housing 12. Housing 12 is also formed over the top of spray bar 64 and terminating in fixed pad retainer 70, which works in conjunction with removal of pad retainer 28 to hold the pads 22 from each side. The spray bar 64 is shown extending under housing 12 and above media pads 22, extending along the entire combined width W of pad media sections 22. The foam sleeve 68 is shown coveting spray bar 64 from end cap 67 on one end of spray bar 64 to the other end cap 67 on the other end of spray bar 64. The longitudinal axis "X" of spray bar 64 may be centered or biased slightly toward the rear of pads 22. Spray bar 64 is disposed parallel to housing 12 between housing 12 and media pad sections 22. Spray bar 64 has a plurality of spaced holes 72 in its upper surface for distributing water from spray bar 64 into foam sleeve 68. Foam sleeve 68 then distributes the water into pad media sections 22. The foam sleeve 68 causes the water from spaced holes 72 to be distributed evenly and fully along the full length of foam sleeve 68, such that there are no dry spots throughout the total width W of the pads 22. Fixed and removable pad retainers 70 and 28 prevent water run-off from the top, front and rear edges of pad media 22, and force the water to penetrate into pad media sections 22. Removable pad media retainer 28 also prevents air bypass over the top of pad media section 22. It is important to note that the end caps 67 prevent the hole 72 from being disposed at the most distal ends of the spray bar 64. This can be a disadvantage in that the water is not distributed to the ends of the media pads 22. With the foam sleeve 68, the water can be laterally distributed to the end of the end cap 67, thus ensuring even distribution of the water over the entire length of the pads 22.

Figure 4:
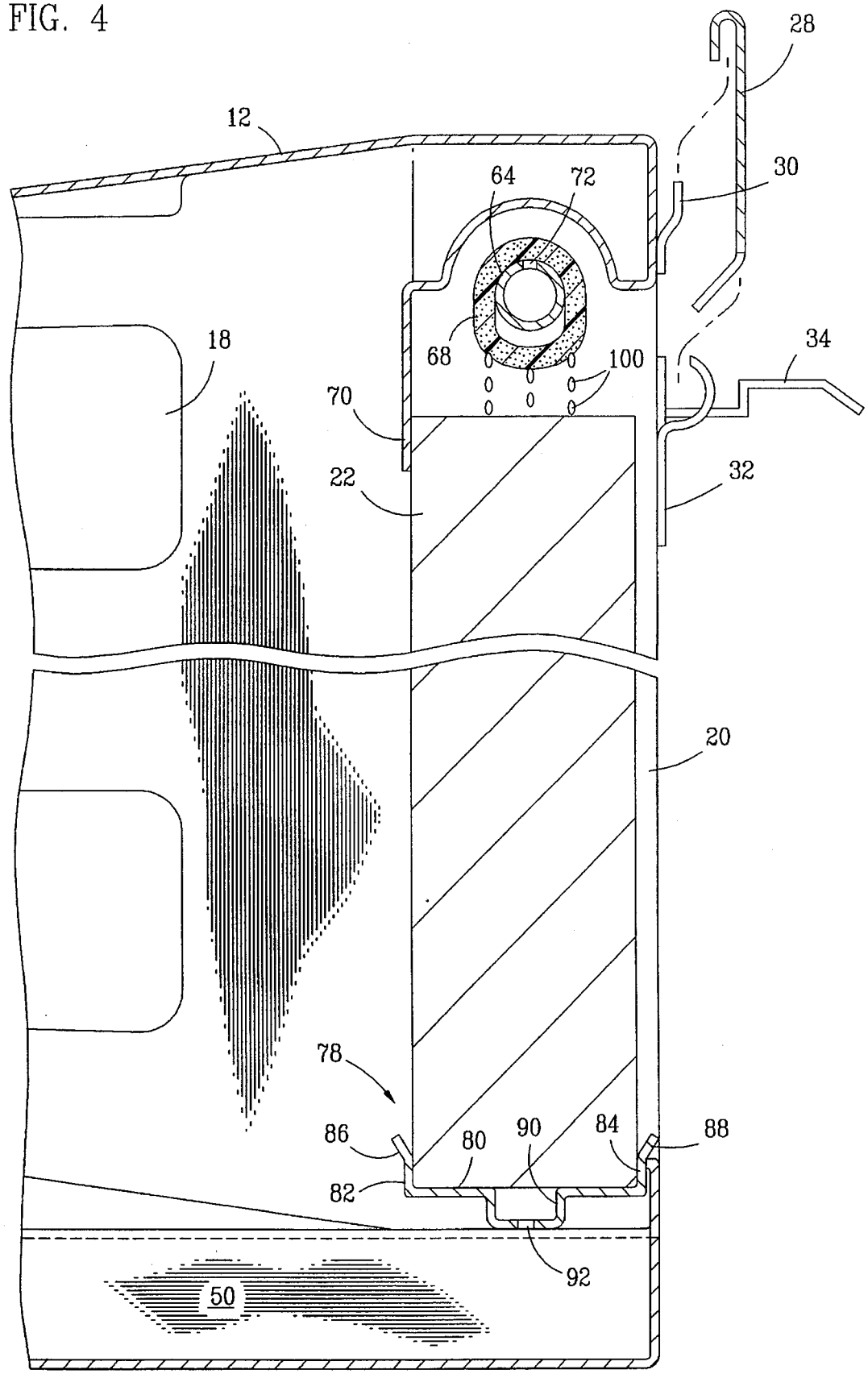
FIG. 4 illustrates a cross-sectional view taken along the line 4—4 in FIG. 2.

Referring now to FIG. 4, there is shown a cross-sectional view taken along the line 4—4 in FIG. 2 of molded housing 12. Trough 78 is disposed at the bottom of rear opening 20 of housing 12 and supports the lower ends of pad media sections 22. Trough 78 extends the entire combined width W of pad media sections 22. Trough 78 is comprised generally of a flat floor 80 having upstanding front and rear walls 82 and 84, respectively. Upper edges 86 and 88 of walls 82 and 84, respectively, are turned outward to facilitate insertion of pad media sections 22 and to trough 78. Turned outward edge 88 of wall 84 also functions as a splash guard to prevent water run-off from pad media sections 22 from wetting the floor or ground area behind evaporative cooling unit 10. Channel 90 lies along the center of trough 78 along its entire length. A plurality of drain holes 92 are formed in the bottom of channel 90. Excess water from pad media sections 22 drains into channel 90 and passes through drain holes 92 and into water tank 50.

The spray bar 64 is shown with sleeve 68 wrapped around it. When water is expelled through spaced holes 72, it is projected upwardly into the foam sleeve 68. The water then is pulled by gravity through the foam sleeve 68 and drips out of the bottom of the foam sleeve 68 onto the media pad 22.

Figure 5:
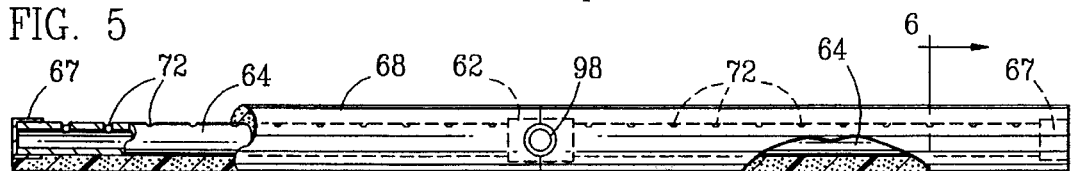
FIG. 5 illustrates a side view of the spray bar of the present invention.

Referring now to FIG. 5, there is shown a side view of spray bar 64. The spray bar 64 is shown covered by two foam sleeves 68. The end caps 67 are either partially or fully covered by foam sleeve 68. A female threaded receiving opening 98 is shown. The "T" fitting 62 is threadably engaged into receiving threaded opening 98.

Figure 6:
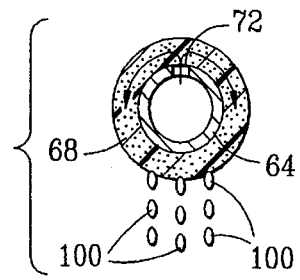
FIG. 6 illustrates cross-sections along line 6—6 of FIG. 5.

Referring now to FIG. 6, there is illustrated a cross-section along line 6—6 of FIG. 5. The foam sleeve 68 is shown having a thickness of ¼ inches. The outside diameter of the foam sleeve 68 is 1 ½ inches, with the inside diameter being one inch. The spray bar 64 is shown inside of the foam sleeve 68. One of the spaced holes 72 is shown at the top of the spray bar 64. Water is ejected through the spaced holes 72, such that it is slowed down and redirected by the foam sleeve 68. The water flows, as shown by the arrows, and then drops away from foam sleeve 68 as shown by water droplets 100. The foam sleeve 68 is made using ¼ inch thick fully reticulated ether foam. The foam is formed into a semi-circular shape and then heat sealed along the seams. The foam is of a length to accommodate the length of the spray bar.

Figure 7:
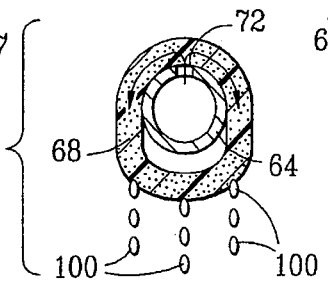
FIG. 7 illustrates cross-sections along line 6—6 of FIG. 5.

When the foam sleeve 68 is saturated with water, it becomes heavier and begins to "sag." This sag results in a deformation, as shown in FIG. 7. It can be seen that the deformation is not arcuate but, rather, slightly flat. This distributes the water over a wider area.

Several of the component parts of the evaporative cooling unit 10 are commercially available, the following being the preferred suppliers: Air-permeable media pad sections 22 are preferably Glacier-Cor™ 30/30 cellulose evaporative cooling pads, available from International Honeycomb Illinois, Inc., University Park, Ill. Glacier-Cor™ evaporative cooling pads are composed of Kraft paper impregnated with a thermosetting resin and formed into a pad with cross-corrugated sheets. Preferably five pads, each pad being 48 inches high, 12 inches high and 6 inches thick, are used in the housing 12 having a four-foot-high by five-foot-wide rear opening 20. Electric motor-driven fan 42 is preferably a 36-inch galvanized vertical fan having a ½-horsepower direct drive motor, sold as Model 3C675 poultry fan by Dayton Electric Manufacturing Co., Chicago, Ill. Submersible self-priming pump 52 is preferably a Model 2P087C mini-submersible sump pump, also sold by Dayton Electric Manufacturing Co. Filter or strainer 60 is preferably a TEEL Model 2P132B line strainer, also sold by Dayton Electric Manufacturing Co. Float valve 96 is preferably a DARE-0-MATIC float valve Model 798 or 1780, sold by Dare Products, Inc., Battlecreek, Mich. Supply conduit 56 and spray bar 64 may be fabricated from ½-inch inner diameter polyvinyl chloride (PVC) pipe. Housing 12 is preferably of uni-body construction and molded from polyethylene by process of roll or rotation molding. Water tank 50 and housing 12 are preferably of a 20-gallon capacity.

In operation, pump 52 continually pumps water from water tank 50 through supply conduit 56 to spray bar 64. Filter 60 and supply conduit 56 remove contaminants and debris from the water before it enters the spray bar 64. The pressurized water in the spray bar 64 sprays upwardly through the spaced holes 72 and into the foam sleeve 68. Foam sleeve 68 captures the water and distributes it along the full length of the foam sleeve 68. When the foam sleeve 68 is fully impregnated with water, the water begins to drip from the foam sleeve 68 onto the pad media sections 22. One important feature of the water distribution system of this invention resides in the location of spaced holes 72 in the upper, rather than the lower, surface of the spray bar 64. Any sediment or impurities which may remain in the water will settle at the bottom of spray bar 64 and will tend to clog holes located there. Sediment clogging of spaced holes 72 is avoiding by locating them in the upper surface of the spray bar 64. Another important feature of this water distribution system is that the foam sleeve 68 evenly distributes the water along the full length W of pad media sections 22, such that there are no dry spots along the width of pad media sections 22. This causes the invention to fully utilize the full width of pad media sections 22 allowing increased cooling efficiency.

The water seeps by gravity into and saturates pad media sections 22. Warm air drawn through pad media sections 22 by fan 42 evaporates moisture from pad media sections 22, thus lowering the air temperature. Excess, unevaporated moisture remaining in pad media sections 22 drains into trough 78 and returns to water tank 50 through drain holes 92. The unevaporated water is then recirculated through pad media sections 22 by pump 52. As water is evaporated from evaporative cooling unit 10, the float valve 96 automatically opens and closes water inlet conduit 94 so as to maintain the correct level of water in the water tank 50.

In extremely high humidity conditions, very little or no water will be evaporated by the air passing through pad media sections 22. In this case, the water tank 50 will simply recirculate water through pad media sections 22 and no makeup water will be needed. Flow control valve 26 is used to increase or decrease the flow rate of water to pad media sections 22. The optimum water delivery rate will vary depending on inlet air temperature and humidity conditions.

Evaporative cooling unit 10 with a 36-inch, ½-horsepower fan delivers approximately 9,500 cubic feet per minute of air and lowered the temperature by as much as 20 degrees F., depending on the humidity conditions. The cooled air discharged by evaporative cooling unit 10 can reach well over 50 feet.

Evaporative cooling unit 10 includes means to conveniently and quickly empty the water tank 50 and supply conduit 94 of water when unit 10 is to be stored during periods of non-use. Water removal is necessary to prevent freeze damage during cold weather periods. To remove residual water, drain valve 24 is opened and flow control valve 26 is closed and pump 52 is only operated until the water in water tank 50 is completely discharged through open drain valve 24. A garden or utility hose can be connected to drain valve 24 if it is desired to discharge the residual water away from unit 10. This device will function on other evaporative cooling units utilizing a spray bar distribution system, not just portable units.

Evaporative cooling unit 10 of the present invention has at least two alternative uses in addition to cooling air. First, a fungicide, deodorizer or disinfectant can be sprayed into the inlet side of the unit to decontaminate, deodorize or disinfect an area in which unit 10 is located.

In summary, there has been provided an evaporative cooling unit. The evaporative cooling unit comprises a housing with front and rear openings for passage of air therethrough. Air-permeable water absorption media are disposed across the rear opening of the housing. An electric motor-driven fan or blower is disposed in the discharge opening of the housing for drawing air through the water absorption media and housing. A supply conduit connects the pump outlet to an elongated horizontal spray bar which is disposed above the water absorption media. The spray bar extends substantially the width of the water absorption media and has a plurality of spaced holes in its upper surface for distributing water. A foam sleeve is provided around the outside of the spray bar. The foam sleeve deflects and absorbs and then releases water from the spray bar onto the water absorption media. A water tank in the housing contains a submersible self-priming pump. A water inlet connectable to an external water source is provided for supplying makeup water to the water tank. A float valve maintains a predetermined level of water in the tank as water is consumed during operation of the unit. The housing is mounted on a frame and casters are attached to the bottom of the frame for providing portability to the unit.

Although the preferred embodiment has been described in detail, it should be understood that various changes, substitutions and alterations can be made therein without departing from the spirit and scope of the invention as defined by the appended claims.

What is claimed is:

1. An evaporative cooling unit, comprising:

a housing having front and rear openings for passage of air therethrough;

air-permeable water absorption media disposed across said rear opening of said housing;

an electric motor-driven fan disposed in said front opening of said housing for drawing air through said water absorption media and said housing;

an elongated conduit disposed generally above said water absorption media, said conduit having a plurality of spaced holes therein;

a reticulated foam sleeve disposed around said elongated conduit, such that water passed through said holes in said elongated conduit is absorbed by said reticulated foam sleeve and the water is then distributed onto said water absorption media along the full length of said reticulated foam sleeve; and water supply means connected to said elongated spray conduit for supplying water thereto.

2. A water delivery device for an evaporative cooling unit, having an air-permeable water absorption media, a fan and a water supply device, the water delivery device comprising:

an elongated spray conduit having end caps and a plurality of spaced holes therein directed upward, said elongated spray conduit having an interior communicating with the water supply device; and a foam sleeve disposed around said elongated spray conduit, such that water sprayed through said holes in said elongated spray conduit is distributed by said foam sleeve about said conduit, the water delivery device disposed over the water absorption media.

3. The water delivery device of claim 2, wherein said foam sleeve, when soaked with water from said elongated spray conduit, deforms so that it sags around said elongated spray conduit and has at least a slightly flat deformation for spreading the water above the air-permeable water absorption media.

4. The water delivery device of claim 2, wherein said elongated spray conduit is disposed generally parallel to the tops of the air-permeable water absorption media.

5. The water delivery device of claim 2, wherein said foam sleeve is defined such that water sprayed through said holes in said elongated spray conduit is absorbed by said foam sleeve, and then distributed fully along the length of said foam sleeve and onto the air-permeable water absorption media.

6. The water delivery device of claim 2, wherein said foam sleeve is fitted to said elongated spray conduit, such that the inside diameter of said foam sleeve is equal to the outside diameter of said elongated spray conduit.

7. The water delivery device of claim 2, wherein the inside diameter of said foam sleeve is slightly larger than the outside diameter of said elongated spray conduit, such that said foam sleeve absorbs water and then said foam sleeve sags downwardly from the elongated spray conduit, forming a gap between said foam sleeve and said elongated spray conduit.

8. The water delivery device of claim 2, wherein said foam sleeve is comprised of fully reticulated ether foam, said ether foam being heat sealed along a seam to form a cylinder.

9. The water delivery device of claim 2, wherein said foam sleeve is disposed around said elongated spray conduit, such that said foam sleeve fully covers the entire length of said elongated spray conduit including end caps.

10. The water delivery device of claim 2, wherein said spaced holes of said elongated spray conduit are disposed along the entire length of said elongated spray conduit.

11. The water delivery device of claim 2, wherein said foam sleeve is disposed along the full width of said elongated spray conduit, such that when water drips from said foam sleeve onto the air-permeable water absorption media, there are no dry areas across the full width of said air-permeable water absorption media.

12. The evaporative cooling unit of claim 2, wherein said foam sleeve is disposed horizontally and extends substantially the width of said water absorption media and covers the full length of said elongated spray conduit, such that it may distribute water from said spray conduit onto the said water absorption media.

13. The evaporative cooling unit of claim 2, wherein said foam sleeve has a generally cylindrical shape, a cross-section taken transverse of its longitudinal axis being generally circular and having a diameter slightly larger than said elongated spray bar.

14. The evaporative cooling unit of claim 1, wherein said foam sleeve captures all water distributed by said spaced holes of said elongated conduit, such that there is no water on the housing of the unit.

15. A method for cooling air, comprising the steps of:

disposing air-permeable water absorption media across a rear opening of a housing;

passing air through the housing also having a front opening using an electric motor-driven fan disposed in the front opening of the housing and drawing air through the water absorption media and the housing;

supplying water to an elongated conduit disposed generally above the water absorption media, the conduit having a plurality of spaced holes therein;

passing the water through the spaced holes; and dispersing the water using a foam sleeve disposed around the elongated spray conduit, wherein the water sprayed through the holes in the elongated spray conduit is absorbed by the foam sleeve, and then is distributed onto the water absorption media, exteriorly of the foam sleeve and fully along the length of the foam sleeve.

16. A method for delivering water in an evaporative cooling unit, having an air-permeable water absorption media, a fan and a water supply means, said method comprising the steps of:

supplying water to an elongated spray conduit having end caps and a plurality of spaced holes therein;

spraying the water through the spaced holes directed upwards; and dispersing the water using a foam sleeve disposed around the elongated spray conduit, such that the water which is sprayed through the holes in the elongated spray conduit is distributed by the foam sleeve about said conduit, the conduit placed over the water absorption media.

17. The method of claim 16, wherein the water sprayed through the holes in the elongated spray conduit and into the foam sleeve is absorbed by the foam sleeve, which deforms in response to absorbing the water so that it sags from beneath the elongated spray conduit with a slightly flat deformation for spreading the water onto the air-permeable water absorption media over an area.

18. The method of claim 16, wherein the elongated spray conduit is disposed generally parallel to the tops of the air-permeable water absorption media.

19. The method of claim 16, wherein the step of dispersing the water sprayed through the holes in the elongated spray conduit using the foam sleeve comprises absorbing the water into the foam sleeve, which then distributes the water fully along the length of the foam sleeve, such that the water then drips from the full length of the foam sleeve onto the air-permeable water absorption media.

20. The method of claim 16, wherein the foam sleeve is fitted to the elongated spray conduit, such that the inside diameter of the foam sleeve is equal to the outside diameter of the elongated spray conduit.

21. The method of claim 16, wherein the inside diameter of the foam sleeve is slightly larger than the outside diameter of the elongated spray conduit, such that when the foam sleeve absorbs water, the foam sleeve sags downwardly from the elongated spray conduit, forming a gap between the foam sleeve and the elongated spray conduit.

22. The method of claim 16, wherein the foam sleeve is comprised of fully reticulated ether foam, the ether foam being heat sealed along a seam to form a cylinder.

23. The method of claim 16, wherein the foam sleeve is disposed around the elongated spray conduit, such that the foam sleeve fully covers the entire length of the elongated spray conduit including end caps.

24. The method of claim 16, wherein the spaced holes of the elongated spray conduit are disposed along the entire length of the elongated spray conduit.

25. The method of claim 16, wherein the foam sleeve is disposed along the full width of the elongated spray conduit, such that when water drips from the foam sleeve onto the air-permeable water absorption media, there are no dry areas across the full width of the air-permeable water absorption media.

26. The method of claim 16, wherein the foam sleeve is disposed horizontally and extends substantially the width of the water absorption media and covers the full length of the elongated spray conduit, such that it may distribute water from the spray conduit onto the water absorption media.

27. The method of claim 16, wherein the foam sleeve has a generally cylindrical shape, a cross-section taken transverse of its longitudinal axis being generally circular and having a diameter slightly larger than the elongated spray bar.

28. The method of claim 15, wherein the foam sleeve captures all water distributed by the spaced holes of said elongated conduit, such that there is no water on the housing of the unit.

* * * * *